(12) United States Patent
Lee et al.

(10) Patent No.: US 11,020,705 B2
(45) Date of Patent: Jun. 1, 2021

(54) POROUS OUTFLOW PIPE FOR FORWARD OSMOSIS OR PRESSURE-RETARDED OSMOSIS, AND FORWARD OSMOSIS OR PRESSURE-RETARDED OSMOSIS MODULE COMPRISING SAME

(71) Applicant: Toray Advanced Materials Korea, Inc., Gyeongsangbuk-do (KR)

(72) Inventors: Sung Yun Lee, Gyeonggi-do (KR); Yeon Ju Sim, Jeollabuk-do (KR); Jong Hwa Lee, Gyeonggi-do (KR)

(73) Assignee: TORAY ADVANCED MATERIALS KOREA INC., Gyeongsangbuk-do (KR)

( * ) Notice: Subject to any disclaimer, the term of this patent is extended or adjusted under 35 U.S.C. 154(b) by 245 days.

(21) Appl. No.: 15/102,822

(22) PCT Filed: Dec. 15, 2014

(86) PCT No.: PCT/KR2014/012339
§ 371 (c)(1),
(2) Date: Jun. 8, 2016

(87) PCT Pub. No.: WO2015/099346
PCT Pub. Date: Jul. 2, 2015

(65) Prior Publication Data
US 2017/0036167 A1    Feb. 9, 2017

(30) Foreign Application Priority Data

Dec. 27, 2013 (KR) .................. 10-2013-0165875

(51) Int. Cl.
*B01D 61/00* (2006.01)
*B01D 63/10* (2006.01)
(Continued)

(52) U.S. Cl.
CPC .......... *B01D 61/002* (2013.01); *B01D 63/10* (2013.01); *B01D 63/12* (2013.01); *C02F 1/445* (2013.01);
(Continued)

(58) Field of Classification Search
CPC .. B01D 61/002; B01D 2311/04; B01D 69/08; B01D 61/005; B01D 63/02; B01D 61/08;
(Continued)

(56) References Cited

U.S. PATENT DOCUMENTS

| 4,033,878 A | 7/1977 | Foreman et al. | |
| 4,080,296 A * | 3/1978 | Clark | B01D 63/024 210/323.2 |
| 4,670,145 A * | 6/1987 | Edwards | B01D 53/22 210/321.87 |
| 5,470,469 A * | 11/1995 | Eckman | B01D 63/02 210/321.8 |

(Continued)

FOREIGN PATENT DOCUMENTS

| CN | 103429314 A | 12/2013 |
| GB | 2499740 A | 8/2013 |

(Continued)

OTHER PUBLICATIONS

ISA/KR, International Search Report dated Mar. 23, 2015 in International Application No. PCT/KR2014/012339, total 4 pages with English translation.

*Primary Examiner* — Ana M Fortuna
(74) *Attorney, Agent, or Firm* — Masuvalley & Partners (57) ABSTRACT

Provided are a porous outflow pipe and an osmosis module comprising same. A porous outflow pipe for forward osmosis or pressure-retarded osmosis, according to one embodiment of the present invention, comprises: a hollow pipe provided with a plurality of first through-holes and second through-holes in the lengthwise direction through which a fluid flows in and out; a bypass pipe arranged concentrically inside the hollow pipe in the lengthwise direction; and a partitioning plate formed along the circumference of the (Continued)

bypass pipe, for preventing mixing of a fluid introduced through the front end side of the hollow pipe and a fluid introduced through the second through-holes.

11 Claims, 8 Drawing Sheets

(51) Int. Cl.
*B01D 63/12* (2006.01)
*C02F 1/44* (2006.01)
*C02F 103/08* (2006.01)

(52) U.S. Cl.
CPC ...... *B01D 2313/10* (2013.01); *B01D 2313/12* (2013.01); *C02F 2103/08* (2013.01); *C02F 2201/002* (2013.01)

(58) Field of Classification Search
CPC ............ B01D 2317/02; B01D 2321/06; B01D 63/10; B01D 63/12; C02F 2103/08; C02F 1/445; C02F 9/00
See application file for complete search history.

(56) References Cited

U.S. PATENT DOCUMENTS

| | | | |
|---|---|---|---|
| 8,354,026 B2 | 1/2013 | Herron | |
| 9,861,938 B2 * | 1/2018 | Uda | B01D 63/10 |
| 2010/0224550 A1 * | 9/2010 | Herron | B01D 63/12 |
| | | | 210/321.74 |
| 2012/0273417 A1 * | 11/2012 | McGinnis | C02F 1/447 |
| | | | 210/637 |
| 2015/0251930 A1 * | 9/2015 | Dufresne | C02F 1/441 |
| | | | 210/638 |
| 2016/0059188 A1 * | 3/2016 | Liberman | F03G 7/005 |
| | | | 417/53 |
| 2016/0082391 A1 * | 3/2016 | Hu | C08L 33/08 |
| | | | 210/644 |
| 2019/0056244 A1 * | 2/2019 | Elliott | G01R 33/0047 |

FOREIGN PATENT DOCUMENTS

| | | | | |
|---|---|---|---|---|
| KR | 10-2011-0002036 A | 1/2011 | | |
| KR | 10-2011-0069818 A | 6/2011 | | |
| WO | WO2015060286 A1 * | 4/2015 | ............ | B01D 71/56 |
| WO | WO2020080469 A1 * | 4/2020 | ............ | B01D 69/00 |

\* cited by examiner

Prior art

POROUS OUTFLOW PIPE FOR FORWARD OSMOSIS OR PRESSURE-RETARDED OSMOSIS, AND FORWARD OSMOSIS OR PRESSURE-RETARDED OSMOSIS MODULE COMPRISING SAME

RELATED APPLICATIONS

This application is the U.S. National Phase of and claims priority to International Patent Application No. PCT/KR/2014/012339, International Filing Date Dec. 15, 2014, entitled POROUS OUTFLOW PIPE FOR FORWARD OSMOSIS OR PRESSURE-RETARDED OSMOSIS, AND FORWARD OSMOSIS OR PRESSURE-RETARDED OSMOSIS MODULE COMPRISING SAME; which claims benefit of Korean Patent Application No. KR10-2013-0165875 filed Dec. 27, 2013; all of which are incorporated herein by reference in their entireties.

TECHNICAL FIELD

The present invention relates to a porous outflow pipe for osmosis and an osmosis module including the same, and more particularly, to a porous outflow pipe for forward osmosis or pressure-retarded osmosis capable of reducing a differential pressure that can be generated when a fluid moves into a forward osmosis or pressure-retarded osmosis separation membrane by improving a fluid flow in the pipes when serially connected by concentrically arranging bypass pipes having a small diameter inside a central pipe and an osmosis module for forward or pressure-retarded osmosis including the same.

BACKGROUND ART

When a semipermeable membrane having a property in which water penetrates the membrane but solutes (ions and molecules) dissolved in the water almost do not penetrate the membrane is installed between solutions of high and low concentration, a natural phenomenon driven by a tendency to reach a concentration equilibrium occurs in which the solvent in the low concentration solution moves to the high concentration solution, and this is referred to as an "osmotic action" or "osmotic phenomenon." The osmotic phenomenon was found in 1867 by M. Traube who was a German chemist, and an osmotic pressure due to an osmotic phenomenon was first measured by Pfeffer in 1877.

The above-described osmotic phenomenon is at the core of seawater desalination technology which is one of the methods to resolve a lack of water which has become serious due to a climate change due to global warming, an increase in industrial water usage due to industrialization, and an increase in water demand due to a population growth.

However, the seawater desalination process remains a highly energy intensive process that has a limitation in an economic aspect in areas where there is not a lack of water like that in the Mille East.

The method for desalinating and using seawater may be mainly divided into evaporation and reverse osmosis methods.

A forward osmosis (FO) method of the above methods is to separate a solution using a membrane by moving a low concentration solution toward a high concentration solution and is very economical compared to the reverse osmosis method because a natural osmosis phenomenon is used and an additional pressure is not required. Accordingly, studies for developing a FO membrane have recently been progressing. A FO separation membrane, an outflow pipe that is included inside an osmosis module and serves a function of causing raw water to flow into a separation membrane, and the like used for the FO method which has a concept that is opposite the reverse osmosis method have features that are distinguished from those used for the reverse osmosis method. Accordingly, the separation membrane, the outflow pipe, and the like used for the FO method cannot be used for the reverse osmosis membrane.

Meanwhile, osmotic power generation refers to generating power using an osmotic effect at a place where two flows having a salinity difference meet. An osmotic pressure of 27 bar may be used for generating power at a place where seawater having a osmotic pressure of 27 bar and river water having an osmotic pressure of almost zero bar meet.

The power generation uses a pressure-retarded osmosis (PRO) method. When high concentration seawater is pressurized at a pressure lower than an osmotic pressure using the PRO method, water flux that penetrates a membrane due to the osmotic pressure is decreased, the osmotic pressure is changed to the water pressure accordingly, and power is generated by turning a turbine using such a water pressure.

Since, in the PRO method, a pressure lower than that of the reverse osmosis method in which a pressure higher than an osmotic pressure is applied to raw water is applied to the raw water, a separation membrane, an outflow pipe, and the like used for the PRO method have features different from those used for the reverse osmosis method. Accordingly, the separation membrane, the outflow pipe, and the like applied to the PRO method cannot be applied to the reverse osmosis membrane.

As described above, since the FO and PRO methods respectively do not apply a pressure to raw water (the FO method) or apply a pressure lower than an osmotic pressure to raw water (the PRO method) unlike the reverse osmosis method, an outflow pipe used for the FO and PRO methods is distinguished from an outflow pipe which has to endure a high pressure and is used for the reverse osmosis method.

Figures 1, 2:
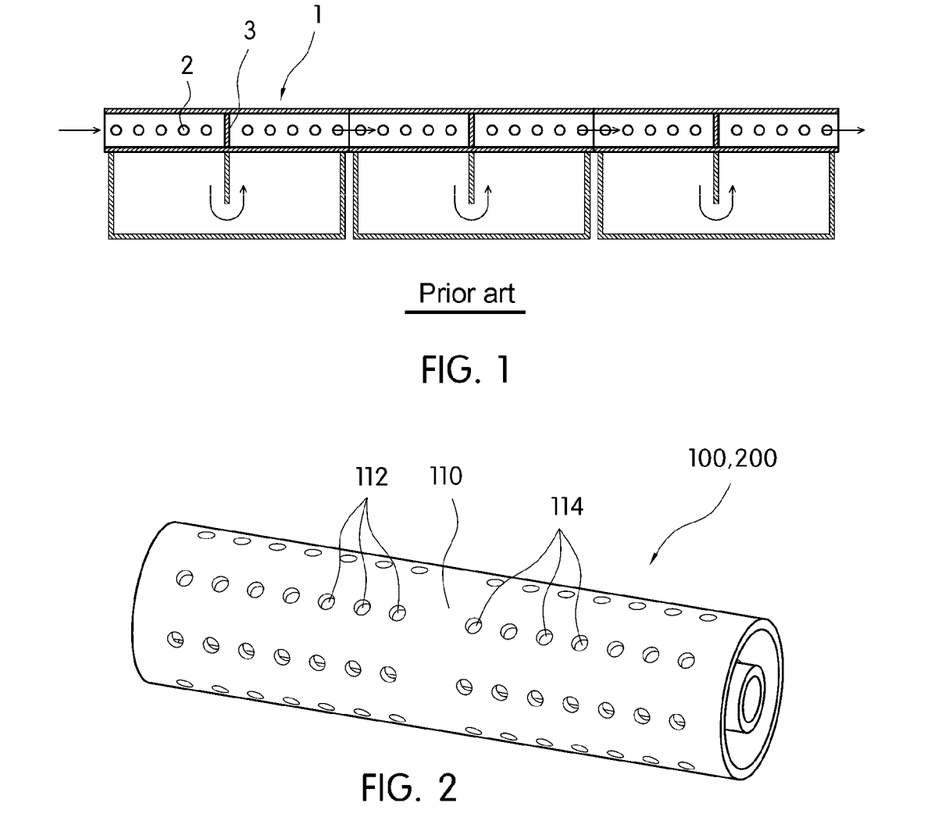
FIG. 1 is a schematic view illustrating a conventional porous outflow pipe for osmosis.
FIG. 2 is an overall perspective view illustrating a porous outflow pipe for forward osmosis or pressure-retarded osmosis according to an exemplary embodiment of the present invention
Figure 3:
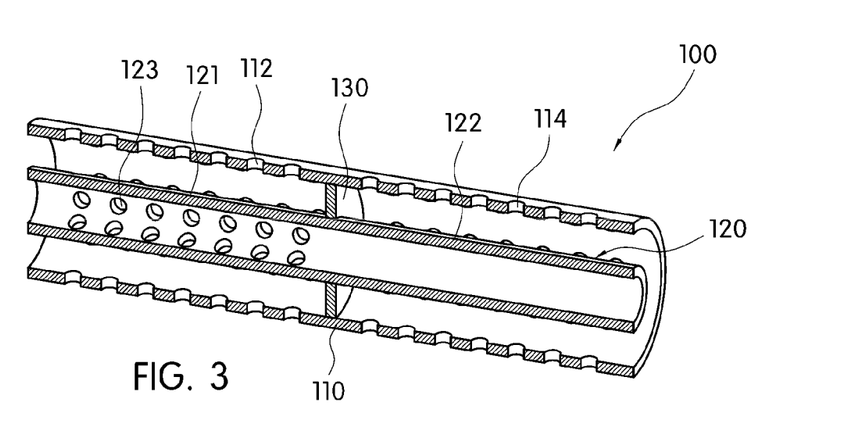
FIG. 3 is a cutaway perspective view illustrating the porous outflow pipe for forward osmosis or pressure-retarded osmosis according to the first embodiment of the present invention.
Figure 4:
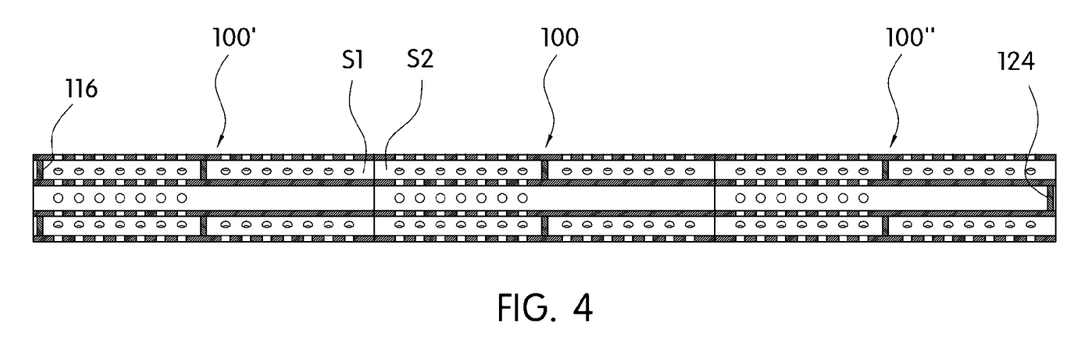
FIG. 4 is a cross-sectional view illustrating a state in which the porous outflow pipes for forward osmosis or pressure-retarded osmosis according to the first embodiment of the present invention are connected in series.

Accordingly, there are problems in that an outflow pipe designed to provide pressure resistance against high pressure and used for the reverse osmosis method may not be used similar to those for the FO method or PRO method, and a flow rate obtained using the outflow pipe (1) used for the conventional FO or PRO method is small, since, as illustrated in FIG. 1, the outflow pipe (1) has a structure in which an introduced fluid is discharged toward a separation membrane through an outflow holes (2) after a flow path of the introduced fluid is changed by a partitioning plate (3), and introduction of a fluid into the FO separation membrane or PRO separation membrane may not be improved, and a gradient of osmosis is not smooth.

In addition, when a diameter, the number, and the like of holes included in the outflow pipe are increased without a limit to improve introduction of a fluid into an osmosis separation membrane, there is a problem in that durability is lowered since damage such as transformation and destruction of an outflow pipe may occur due to a pressure of a fluid flowing into the outflow pipe.

A helically wound membrane module for FO which has disclosed in Korean Patent Application No. 010-7023340 disclosed that only the osmosis module may include or may also not include a permeate tube for adopting one or more fluid streams or for collecting water, there was no description of how the permeate tube is formed, and how the effect was. However, since a flow rate introduced into the osmosis separation membrane may be improved according to a configuration of the permeate tube to improve a flux of water through the osmosis separation membrane, and a porous penetrating water outflow pipe used for FO or PRO is clearly distinguished from an outflow pipe used for reverse osmosis, a study for the porous penetrating water outflow pipe used for the FO or the PRO is urgent.

DISCLOSURE

Technical Problem

The present invention is directed to providing an porous outflow pipe for forward osmosis or pressure-retarded osmosis capable of reducing a differential pressure by concentrically arranging a bypass pipe having a small diameter inside a central pipe, improving a fluid flow in the pipe when serially connected, and smoothing the fluid flow into a forward osmosis or pressure-retarded osmosis separation membrane, and an osmosis module for forward or pressure-retarded osmosis including the same.

Technical Solution

One aspect of the present invention provides a porous outflow pipe for forward osmosis or pressure-retarded osmosis including: a hollow pipe in which a plurality of first via holes and second via holes through which a fluid is introduced and discharged penetrate the hollow pipe and are formed in a lengthwise direction; a bypass pipe concentrically disposed inside the hollow pipe in the lengthwise direction; and a partitioning plate formed in a circumferential direction of the bypass pipe to mutually block a fluid introduced into the front end of the hollow pipe and another fluid introduced through the second via holes.

Here, a plurality of the porous outflow pipes for forward osmosis or pressure-retarded osmosis may be connected in series, and some of the fluid introduced from the bypass pipe disposed at the front to the hollow pipe disposed at the rear may be directly introduced into the hollow pipe connected adjacent to the rear through the bypass pipe, and the remaining fluid may be mixed with a fluid introduced from the hollow pipe disposed at the front, discharged to the outside through the first via holes, and introduced through the second via holes.

Here, the bypass pipe may be entirely disposed inside the hollow pipe in the lengthwise direction and may include a first portion in which third via holes through which the fluid is introduced and discharged penetrate the bypass pipe and are formed in the lengthwise direction and a second portion in which the third via holes are not formed.

Here, the first portion and the second portion may be divided on the basis of the partitioning plate.

Here, the first portion may be disposed in front of the second portion.

Here, a first blocking plate which seals a remaining region except the first portion may be provided at the front end of the hollow pipe so that a fluid is introduced only into the bypass pipe.

Here, a second blocking plate may be provided at a rear end of the second portion to block discharging of a fluid.

Here, in the porous outflow pipes adjacent to each other, a rear end of the second portion included in the porous outflow pipe disposed at the front and a front end of the first portion included in the porous outflow pipe disposed at the rear may be connected each other.

Here, the bypass pipe may be disposed only at the rear on the basis of the partitioning plate.

Here, a second blocking plate may be provided at the rear end of the bypass pipe to block discharging of a fluid.

Here, the partitioning plate may be disposed at a position corresponding to a half of an entire length of the hollow pipe.

Here, the first via holes and the second via holes may be disposed at opposite sides of the partitioning plate as a boundary.

In addition, another aspect of the present invention provides a forward osmosis module including: the porous outflow pipe for forward osmosis that is any one of claims 1 to 12; and a plurality of separation membranes which helically wind an external circumferential surface of the porous outflow pipe in a circumferential direction.

Meanwhile, still another aspect of the present invention provides a pressure-retarded osmosis module including: the porous outflow pipe for pressure-retarded osmosis that is any one of claims 1 to 12; and a plurality of separation membranes which helically wind an external circumferential surface of the porous outflow pipe in a circumferential direction.

Advantageous Effects

An porous outflow pipe for forward osmosis or pressure-retarded osmosis and an osmosis module for forward or pressure-retarded osmosis according to one embodiment of the present invention has an advantage of reducing a differential pressure by concentrically arranging a bypass pipe having a small diameter inside a central pipe, improving a fluid flow in the pipes when serially connected, and smoothing the fluid flow into a forward osmosis or PRO separation membrane.

MODES OF THE INVENTION

Hereinafter, the exemplary embodiment of the present invention will be described in detail with reference to the accompanying drawings.

Hereinafter, when reference numerals are assigned to components of each drawing, even when same components are illustrated in different drawings, the same numerals are assigned to the same components.

As illustrated in FIGS. 2 to 10, in a porous outflow pipe for forward osmosis or pressure-retarded osmosis 100 or 200 according to an exemplary embodiment of the present invention, as a bypass pipe 120 or 220 is concentrically arranged inside of a hollow pipe 110, some of the fluid A introduced from the bypass pipe 120 or 220 of the hollow pipe 110 disposed at the front to the hollow pipe 110 disposed at the rear is directly introduced into the hollow pipe 110 connected adjacent to the rear through the bypass pipe 120, the other is mixed with the fluid B introduced from the hollow pipe 110 disposed at the front side and discharged to the outside through a first via hole 112 and flows into a second via hole 114, and thereby a differential pressure is decreased and a fluid flow becomes smooth.

Such a porous outflow pipe for forward osmosis or pressure-retarded osmosis 100 or 200 according to the exemplary embodiment of the present invention includes the hollow pipe 110, the bypass pipe 120 or 220, and a partitioning plate 130.

Figure 10:
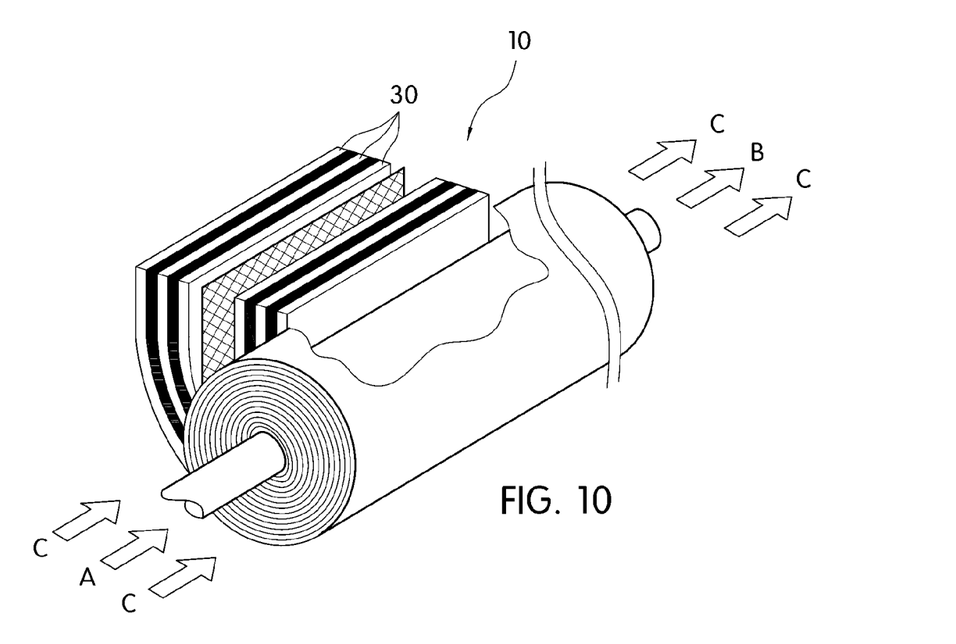
FIG. 10 is a partial cutaway perspective view illustrated in FIG. 9.

As illustrated in FIG. 10, the hollow pipe 110 is installed to cross a central portion of an osmosis module 10 in a lengthwise direction and serves as a transfer pipe which transfer a fluid introduced from the outside to a separation membrane 30 in the lengthwise direction, wherein the separation membrane 30 covers an external circumferential surface.

Such a hollow pipe 110 includes a pipe member having a predetermined length and a hollow shape, a plurality of first via holes 112 and second via holes 114 are formed at the external circumferential surface in the lengthwise direction, and thus a fluid supplied from the outside may be introduced and discharged.

Here, the first via holes 112 are provided in front of a partitioning plate 130 disposed in a direction which crosses inside of the hollow pipe 110, and the second via holes 114 are disposed at the rear of the partitioning plate 130 in the lengthwise direction.

The first via holes 112 and the second via holes 114 serve as flow paths through which a fluid introduced into the front end of the hollow pipe 110 is discharged to the outside or introduced into the hollow pipe 110, and directions of a fluid flow in the first via hole 112 and the second via hole 114 are opposite each other.

For example, a fluid A introduced into the front end of the hollow pipe 110 is discharged to the outside only through the first via holes 112 and is moved toward the separation membrane 30, and a fluid B introduced into the hollow pipe 110 from the separation membrane 30 is introduced into the hollow pipe 110 only through the second via holes 114.

The bypass pipe 120 or 220 is concentrically disposed at the inside of the hollow pipe 110 in the lengthwise direction so that some of the fluid introduced through the front end of the hollow pipe 110 is not discharged to the outside through the first via hole 112, directly moves toward the hollow pipe 110 connected to the rear end of the hollow pipe 110 in series, and thus reduces a differential pressure generated when connected in series.

Such a bypass pipe 120 or 220 is provided with a pipe member having a predetermined length and a hollow shape similar to the hollow pipe 110. Here, as the bypass pipe 120 or 220 is provided to have a diameter less than that of the hollow pipe 110, the bypass pipe 120 or 220 is inserted into and disposed inside the hollow pipe 110, is supported by the partitioning plate 130 disposed in a circumferential direction of the bypass pipe 120 or 220, and is concentrically arranged with the hollow pipe 110.

Here, as the partitioning plate 130 is disposed to cover the bypass pipe 120 or 220 at a position corresponding to a half of an entire length of the hollow pipe 110, the partitioning plate 130 serves to change a flow path of a fluid introduced into the front end of the hollow pipe 110.

Specifically, since a flow path of the fluid is blocked by the partitioning plate 130 and a fluid A introduced into the front end of the hollow pipe 110 is introduced to be discharged to the outside through the first via holes 112 formed at the front end of the hollow pipe 110, more fluid flows to the outside of the hollow pipe 110. Accordingly, an amount of a fluid flowing toward the separation membrane 30 which covers the outside of the hollow pipe 110 may be increased.

Here, the partitioning plate 130 is provided to have a suitable thickness to endure a pressure of a fluid flowing inside of the hollow pipe 110, may generally include any material for a partitioning plate used for a porous outflow pipe for forward osmosis or pressure-retarded osmosis although may preferably include an epoxy hardener, and may also include a material such as a silicone, rubber, or the like.

Meanwhile, although the partitioning plate 130 is illustrated in the drawings to be positioned at the position corresponding to the half of the entire length of the hollow pipe 110, it is not limited thereto, and may also be positioned at various positions such as corresponding to one third or one fourth of the entire length of the hollow pipe 110.

As illustrated in FIGS. 2 to 5, the bypass pipe 120 is provided to have an overall length approximately the same as that of the hollow pipe 110 and is disposed to occupy most of the inside of the hollow pipe 110.

Here, the bypass pipe 120 is provided with a first portion 121 in which third via holes 123 through which a fluid is introduced and discharged are formed and a second portion 122 in which the third via holes 123 are not formed. Here, the first portion 121 and the second portion 122 are disposed inside the hollow pipe 110 to be disposed left and right with respect to the partitioning plate 130, and the first portion 121 in which the third via holes 123 are formed is disposed in front of the second portion 122.

Figure 5:
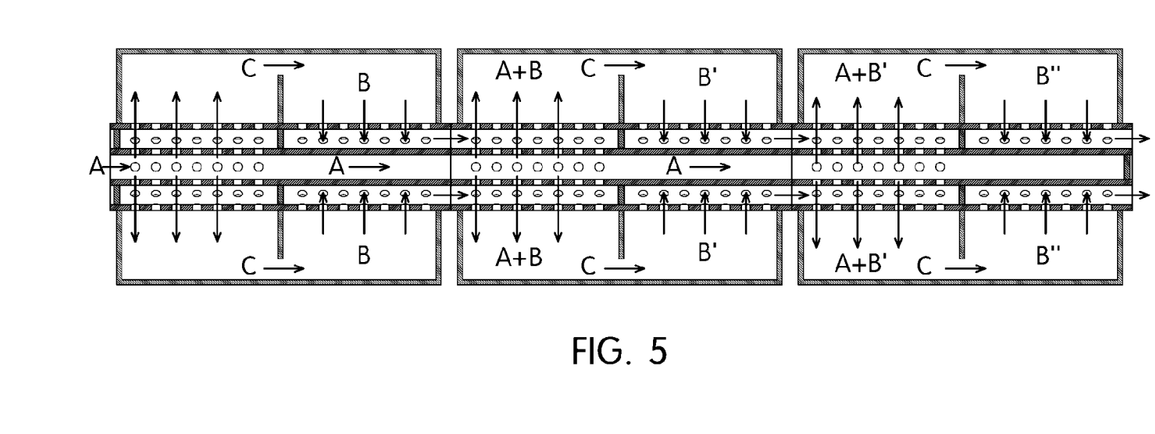
FIG. 5 is a conceptual view illustrating a flow path of a fluid illustrated in FIG. 4.

Accordingly, as illustrated in FIG. 5, when the porous outflow pipe for osmosis 100 according to the exemplary embodiment of the present invention is provided in plurality and connected in series so that ends of the bypass pipes 120 are connected to each other, some of a fluid A introduced from the bypass pipe 120 disposed at the front to the hollow pipe 110 disposed at the rear is directly introduced into the hollow pipe 110 connected adjacent to the rear through the bypass pipe 120, the other is mixed with a fluid B introduced from the hollow pipe 110 disposed at the front, discharged to the outside through the first via holes 112, and introduced into the second via holes 114.

Here, the fluid A introduced from the hollow pipe 110 disposed at the front refers to a fluid C which is discharged to the outside through the third via holes 123 and the first via holes 112, flows in the separation membrane 30, and flows the outside of the hollow pipe 110 and the fluid B which is diluted due to an osmotic action and is introduced into a space S1 formed between an internal circumferential surface of the hollow pipe 110 and an external circumferential surface of the bypass pipe 120 or 220 through the second via holes 114.

Here, when the plurality of porous outflow pipes for osmosis 100 are connected in series, a porous outflow pipe 100' disposed at the foremost end is provided with a first blocking plate 116 at a remaining portion of the front end excluding the bypass pipe 120 so that a fluid A introduced from the outside is introduced only into the first portion 121 of the bypass pipe 120. In addition, when the plurality of porous outflow pipes for osmosis 100 are connected in series, a porous outflow pipe 100'' disposed at the rearmost end is provided with a second blocking plate 124 at the rear end of the second portion 122 for blocking a fluid from being discharged to the outside through an end portion of the bypass pipe 120.

Accordingly, as illustrated in FIG. 5, when the plurality of porous outflow pipe for forward osmosis or pressure-retarded osmosis 100 according to a first embodiment of the present invention are connected in series, a fluid A supplied from the outside is introduced into inside through the bypass pipe 120 of the outflow pipe 100' disposed at the foremost end. Then, some of the fluid is directly moved toward the porous outflow pipe 100 disposed at the rear through the bypass pipe 120, and the remaining fluid is moved toward the separation membrane 30 through the third via holes 123 and the first via holes 112, causes an osmosis action to occurs, is introduced into the space S1 divided by an external circumferential surface of the second portion 122, the internal circumferential surface of the hollow pipe 110, and the partitioning plate 130 through the second via holes 114, and is moved toward the porous outflow pipe 100 disposed at the rear, more specifically, to a space S2 divided by the external circumferential surface of the first portion 121, the internal circumferential surface of the hollow pipe 110, and the partitioning plate 130. Then, as the fluid introduced into the porous outflow pipe 100'' through the same process is blocked from being discharged to the outside by the second blocking plate 124 provided at the end portion of the second portion 122, the fluid is discharged to the outside through the space S1 covered by the external circumferential surface of the second portion 122, the partitioning plate 130, and the internal circumferential surface of the hollow pipe 110.

Figure 6:
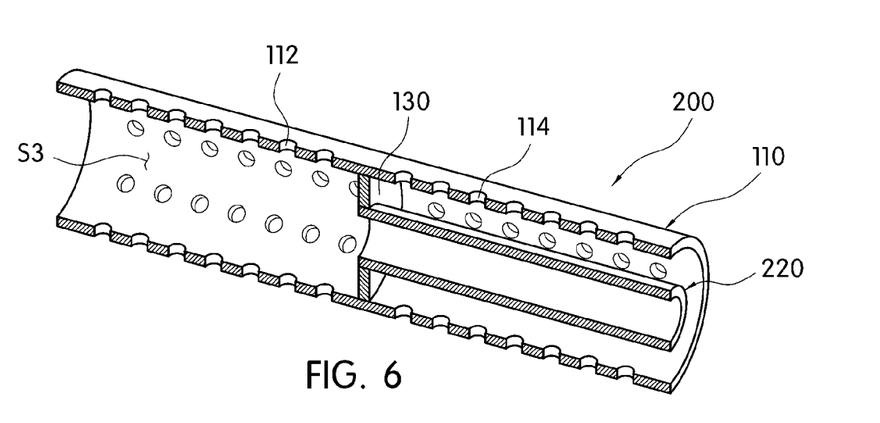
FIG. 6 is an overall perspective view illustrating a porous outflow pipe for forward osmosis or pressure-retarded osmosis according to a second embodiment of the present invention.
Figure 7:
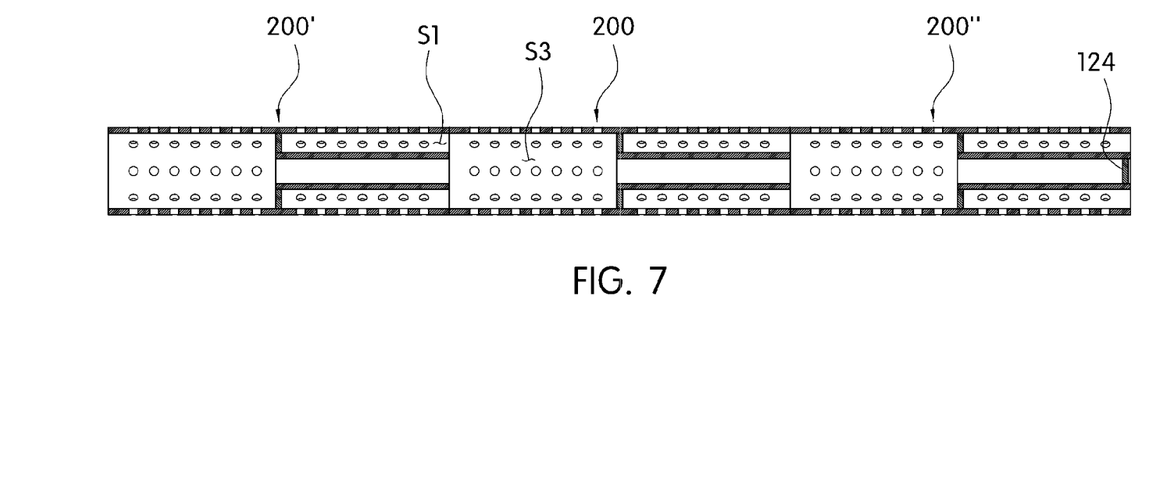
FIG. 7 is a cross-sectional view illustrating a state in which the porous outflow pipes for forward osmosis or pressure-retarded osmosis according to the second embodiment of the present invention are connected in series.
Figure 8:
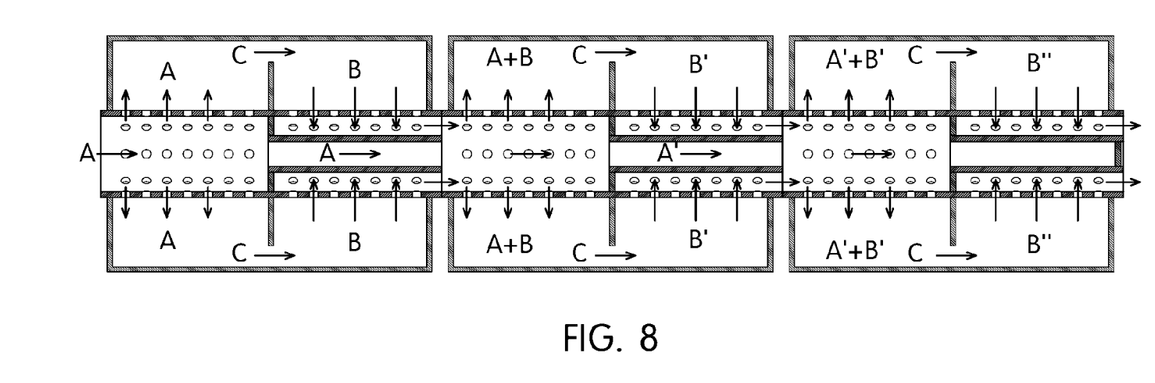
FIG. 8 is a conceptual view illustrating a flow path of a fluid illustrated in FIG. 7.

Meanwhile, as illustrated in FIGS. 6 to 8, the bypass pipe 220 may also be provided shorter than the entire length of the hollow pipe 110 and disposed at part of the inside of the hollow pipe 110.

Here, the bypass pipe 220 is only disposed at the rear side with respect to the partitioning plate 130 in the hollow pipe 110, and an additional third via hole 123 through which a fluid is introduced from and discharged to the outside is not formed.

Accordingly, a space S3 in which a fluid directly moved from the bypass pipe 220 of a porous outflow pipe 200' and a fluid which is moved toward the separation membrane 30 through the first via holes 112 and causes an osmotic action to occur are simultaneously introduced and mixed is provided at the front of the bypass pipe 220 inside the hollow pipe 110

Accordingly, even though the plurality of porous outflow pipes for forward osmosis or pressure-retarded osmosis 100 or 200 according to the exemplary embodiment of the present invention are connected in series, since a fluid smoothly flows through the bypass pipe 120 or 220 concentrically arranged inside the hollow pipe 110, a differential pressure that occurs in a process in which the fluid moves toward the separation membrane 30 may be reduced.

Figure 9:
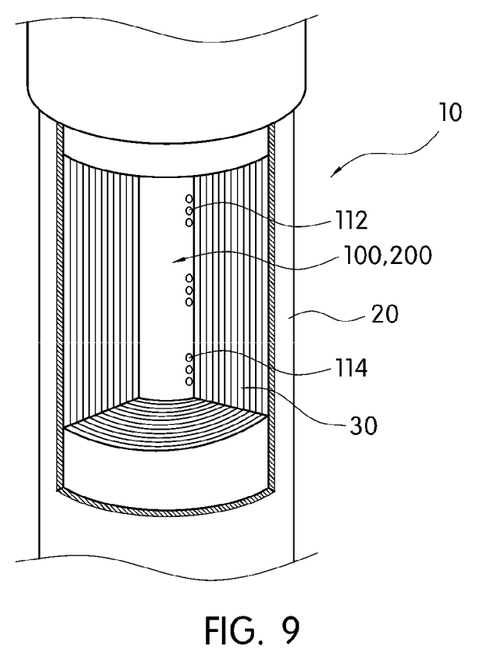
FIG. 9 is a longitudinal cross-sectional view illustrating an osmosis module to which the porous outflow pipe for forward osmosis or pressure-retarded osmosis according to the exemplary embodiment of the present invention is applied.

Meanwhile, as illustrated in FIGS. 9 and 10, the porous outflow pipe for forward osmosis or pressure-retarded osmosis 100 or 200 according to the exemplary embodiment of the present invention may constitute a forward osmosis module or pressure-retarded osmosis module 10 in which a plurality of separation membranes 30 that helically wind the external circumferential surface in a circumferential direction are disposed and an external case 20 which accommodates the plurality of separation membranes 30.

Here, since the separation membrane 30 is used for both forward osmosis and pressure-retarded osmosis and has a conventional structure forming a pocket shape by overlapping two separation membranes each other, a detail description thereof is omitted. In addition, since the external case 20 also has a conventional structure used for the forward osmosis module or pressure-retarded osmosis module, a detail description thereof is omitted.

While the specific embodiments of the present invention are described in detail with respect to drawings, the present invention is not limited to the specific structures. Those of ordinary skill in the art may modify or change without departing from the technical spirit defined by the following claims. However, equivalents, modifications, and replacements through such a simple design change or modification clearly fall within the scope of the appended claims.

The invention claimed is:

1. A forward osmosis module which comprising a plurality of separation membranes which helically wind an external circumferential surface of a porous outflow pipe for forward osmosis in a circumferential direction,
    wherein the forward osmosis module, comprising:
    a hollow pipe having at least a first via hole and a second via hole through which a fluid is introduced and discharged penetrate the hollow pipe and are formed in a lengthwise direction;
    a bypass pipe concentrically disposed inside the hollow pipe in the lengthwise direction;
    a partitioning plate formed in a circumferential direction of the bypass pipe wherein the first via holes are provided in front of the partitioning plate and the second via holes are provided at the rear of the partitioning plate, wherein the partitioning plate mutually blocks a fluid introduced into the front end of the hollow pipe and another fluid introduced into the hollow pipe through the second hole; and
    a plurality of the porous outflow pipes are connected in series;
    wherein some of the fluid introduced from a bypass pipe of a first porous outflow pipes disposed at the front among the plurality of the porous outflow pipes to a hollow pipe of a second porous outflow pipes disposed at the rear is directly introduced into a hollow pipe of a third porous outflow connected to the rear through a bypass pipe of the second porous outflow pipes, and the remaining fluid is mixed with a fluid which is introduced from the hollow pipe of the first porous outflow pipes into the hollow pipe of the second porous outflow pipes inside the hollow pipe of the second porous outflow pipes and then the mixed remaining fluid is discharged to the outside through the first via holes of the second porous outflow pipes, and introduced into the second via holes of the second porous outflow pipes.

2. The forward osmosis module of claim 1, wherein the first portion and the second portion are divided on the basis of the partitioning plate.

3. The forward osmosis module claim 1, wherein the first portion is disposed in front of the second portion.

4. The forward osmosis module of claim 3, further comprising a first blocking plate which seals a remaining region except the first portion is provided at the front end of the hollow pipe of a porous outflow pipes disposed at the foremost end among the plurality of the porous outflow pipes so that a fluid is introduced only into the bypass pipe.

5. The forward osmosis module of claim 3, further comprising a second blocking plate provided at a rear end of the second portion of a porous outflow pipes disposed at the rearmost end among the plurality of the porous outflow pipes to block discharging of a fluid.

6. The forward osmosis module of claim 3, wherein, the plurality of porous outflow pipes connected in series are adjacent to each other, a rear end of the second portion included in the porous outflow pipe disposed at the front and a front end of the first portion included in the porous outflow pipe disposed at the rear are connected to each other.

7. The forward osmosis module of claim 1, wherein the bypass pipe is disposed only at the rear on the basis of the partitioning plate.

8. The forward osmosis module of claim 7, wherein a second blocking plate is provided at a rear end of the bypass pipe of a porous outflow pipes disposed at the rearmost end among the plurality of the porous outflow pipes to block discharging of a fluid.

9. The forward osmosis module of claim 1, wherein the partitioning plate is disposed at a position corresponding to a half of an entire length of the hollow pipe.

10. The forward osmosis module of claim 1, wherein the first via holes and the second via holes are disposed at opposite sides of the partitioning plate as a boundary.

11. The forward osmosis module of claim 1, wherein the bypass pipe is entirely disposed inside the hollow pipe in the lengthwise direction and includes a first portion in which third via holes through which the fluid is introduced and discharged penetrate the bypass pipe and are formed in the lengthwise direction and a second portion in which the third via holes are not formed.

* * * * *